(No Model.)

J. W. WARREN & S. H. RADFORD.
REVOLVING SIGNAL.

No. 409,534. Patented Aug. 20, 1889.

WITNESSES,
Villette Anderson,
Mary Boykin.

INVENTORS,
John W. Warren,
Samuel H. Radford,
by E. W. Anderson.
Attorney.

UNITED STATES PATENT OFFICE.

JOHN W. WARREN, OF MINEOLA, TEXAS, AND SAMUEL H. RADFORD, OF HARTSVILLE, ALABAMA; SAID RADFORD ASSIGNOR TO A. C. CUNNINGHAM, OF MINEOLA, TEXAS.

REVOLVING SIGNAL.

SPECIFICATION forming part of Letters Patent No. 409,534, dated August 20, 1889.

Application filed January 28, 1889. Serial No. 297,788. (No model.)

*To all whom it may concern:*

Be it known that we, JOHN W. WARREN, a citizen of the United States, residing at Mineola, Wood county, Texas, and SAMUEL H. RADFORD, a citizen of the United States, and a resident of Hartsville, in the county of Morgan and State of Alabama, have invented certain new and useful Improvements in Revolving Signals; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
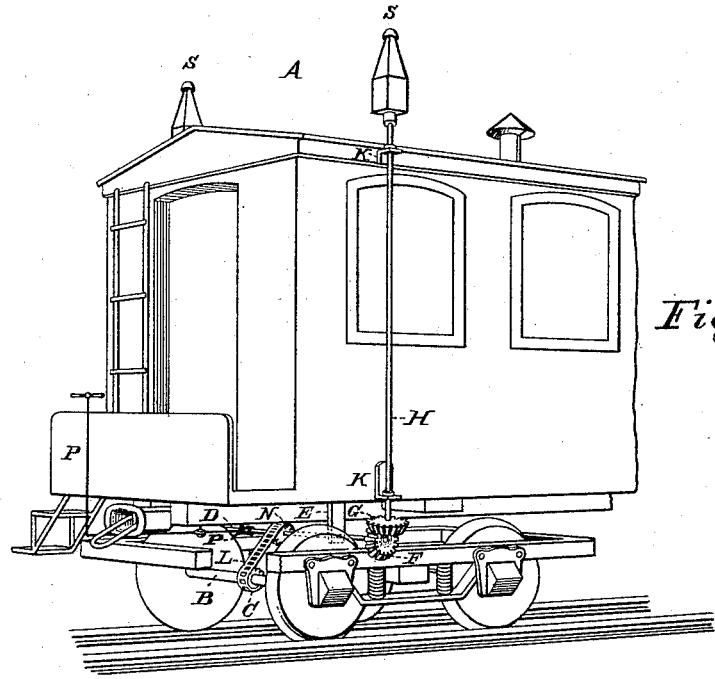
Figure 2:
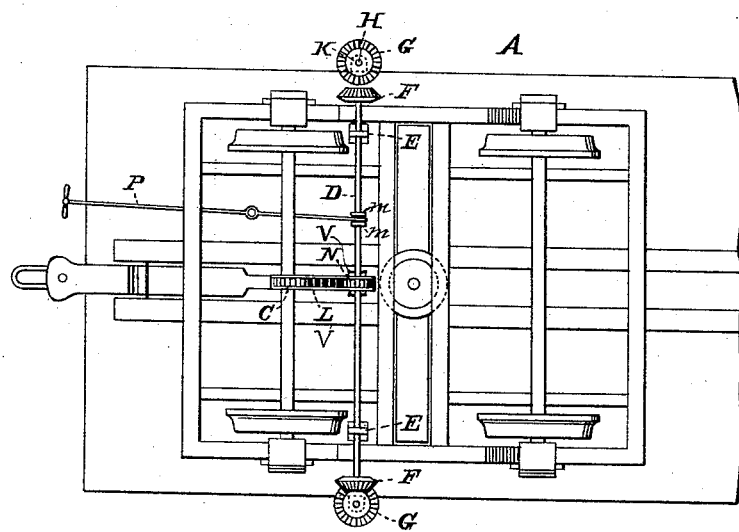

Figure 1 of the drawings is a representation of this invention and is a perspective view. Fig. 2 is a bottom view.

This invention has relation to revolving signal-lights for railroad-trains; and it consists in the construction and novel combination of devices, all as hereinafter set forth, and pointed out in the appended claims.

In the accompanying drawings, the letter A designates the caboose or the rear car of a train, and B an axle thereof, having a chain-wheel C thereon; or the chain-wheel may be keyed to an axle of an engine, the device being useful in connection with switch-engines.

D represents a revolving shaft under the car parallel to the axle in bearings E, and having bevel gear-wheels F, which engage bevel gear-wheels G of the upright stems or rods H, which are seated in bearings K at the sides of the car. A belt-chain L connects the wheel C to a wheel N of the shaft D.

S S indicate the lanterns or signals which are secured to the stems H and are designed to revolve therewith when the car is moving, the motion being communicated from the axle through the shaft D and stem H.

P represents a shifting device or coupling and uncoupling clutch in connection with the revolving mechanism adapted to throw one of the lateral signal-stems in gear and the other out, and preferably the signal in gear is that on the right of the car, so that when the train is going the signal will turn to the right, and when coming its motion will appear reversed or to the left. As either signal-stem may be brought in gear it is apparent that the device is adapted for use in connection with cars which move either end forward. Preferably the shifting device is arranged in connection with the bevel-gearing, and for this purpose the shaft D may be squared to slide in the squared eye of the chain-wheel N, which is kept in position by suitable stops V. A lever P, arranged to engage bearings $m$ of said shaft, will serve to shift the shaft D into engagement with the bevel-wheel on one side or with that on the other side of the car. The lantern S is provided with colored glasses, the upper part of the glazed portion being alternately of different colors—preferably white and blue—and the lower part of said glazed portion being red. In this manner the light will be distinguished readily from any other.

The signal-light is designed to show whether the train is moving toward or from an observer, or is not in motion. It may also be arranged, by observing a mathematical system in providing the gearing in connection with the axle, to enable an observer to determine the rate of speed at which the train is running.

Having described this invention, what we claim, and desire to secure by Letters Patent, is—

The combination, with a car-axle and a shaft driven thereby, of the lateral supporting-stems carrying signaling-lanterns glazed in alternating colors, a shifting-lever acting alternately upon studs or stops of the said shaft, said shaft having a sliding movement and gearing alternately with said signal-carrying stems, substantially as set forth.

In testimony whereof we affix our signatures in presence of two witnesses.

JOHN W. WARREN.
SAMUEL H. RADFORD.

Witnesses:
A. C. CUNNINGHAM,
J. C. HAYS.